United States Patent [19]

Schenk

[11] Patent Number: 4,688,245
[45] Date of Patent: Aug. 18, 1987

[54] METHOD AND CIRCUIT ARRANGEMENT FOR COMPENSATING CROSS-TALK AND/OR ECHO SIGNALS

[75] Inventor: Heinrich Schenk, Munich, Fed. Rep. of Germany

[73] Assignee: Siemens Aktiengesellschaft, Berlin and Munich, Fed. Rep. of Germany

[21] Appl. No.: 677,361

[22] Filed: Dec. 3, 1984

[30] Foreign Application Priority Data

Dec. 1, 1983 [DE] Fed. Rep. of Germany ....... 3343584
Apr. 17, 1984 [DE] Fed. Rep. of Germany ....... 3414534
Apr. 17, 1984 [DE] Fed. Rep. of Germany ....... 3414523
Apr. 17, 1984 [DE] Fed. Rep. of Germany ....... 3414554

[51] Int. Cl.$^4$ ............................................. H04B 3/23
[52] U.S. Cl. .................................. 379/410; 370/32.1; 379/406
[58] Field of Search ................ 179/170.2, 170.6, 170.8; 370/32, 32.1; 379/406, 410, 411

[56] References Cited

U.S. PATENT DOCUMENTS 4,484,322 11/1984 Fossati et al. ......................... 370/32
4,535,206 8/1985 Falconer ............................ 370/32.1
4,549,048 10/1985 Combier ............................ 370/32.1
4,571,465 2/1986 Brie et al. ............................ 370/32.1

OTHER PUBLICATIONS

"A New Digital Echo Canceller for Two-Wire Full-Duplex Data Transmission", K. H. Mueller, Transactions on Communications, vol. Com–24, No. 9, Sep. 1976, pp. 956–962.
Mueller, "Combining Echo Cancellation and Decision Feedback Equalization", BSTJ, Feb. 1979, pp. 491–500.
Moehrmann, "The Adaptive Equalization of Transmission Systems", AGARD Conf. Proc., No. 103, May 1972, pp. 12.1–12.16.
Moehrmann, "Einige Verfahren . . . Datenübertragung", NTZ, 1971, No. 1, pp. 18–24.
Moehrmann, "Adaptive Verfahren in der Übertragungstechnil (Teill)", Frequenz, vol. 28, No. 5, 1974, pp. 118–161.
Wahrmann, "Entstehung . . . Fernsprechlietungen", der Fernmelde-Ingenieur, vol. 31, No. 12, Dec. 15, 1977, pp. 2–28.
Bocker, "Datenübertragung", 1976, pp. 214–231.

Primary Examiner—Gene Z. Rubinson
Assistant Examiner—R. Vaas
Attorney, Agent, or Firm—Hill, Van Santen, Steadman & Simpson

[57] ABSTRACT

In an adaptive crosstalk and/or echo compensation circuit which is arranged on the four-wire side parallel to a hybrid circuit and which has a variable filter and a compensation signal logic-linking element, the compensation signal is formed in dependence upon the, possibly averaged, difference between a decision device output signal formed following the signal compensation and following an adaptive signal equalization, and the decision device input signal. In the case of a greater, possibly averaged, difference between the decision device input and output signals, the filter coefficients are set in accordance with the compensated received signal, or only the sign thereof, and in the case of a smaller, possibly averaged, difference, the filter coefficients are set in accordance with this difference, or only the sign thereof. A compromise equalization of the received signal can take place prior to the crosstalk and/or echo compensation. Following the crosstalk and/or echo compensation, first a regulated amplification can take place, here the setting signal for the variable filter, which signal is derived from the difference between the decision device input and output signals, and when the filter setting signal which corresponds to the compensated received signal is derived from the compensated and amplified received signal, also this setting signal can be multiplied by a factor which is reciprocally proportional to the amplification factor.

22 Claims, 3 Drawing Figures

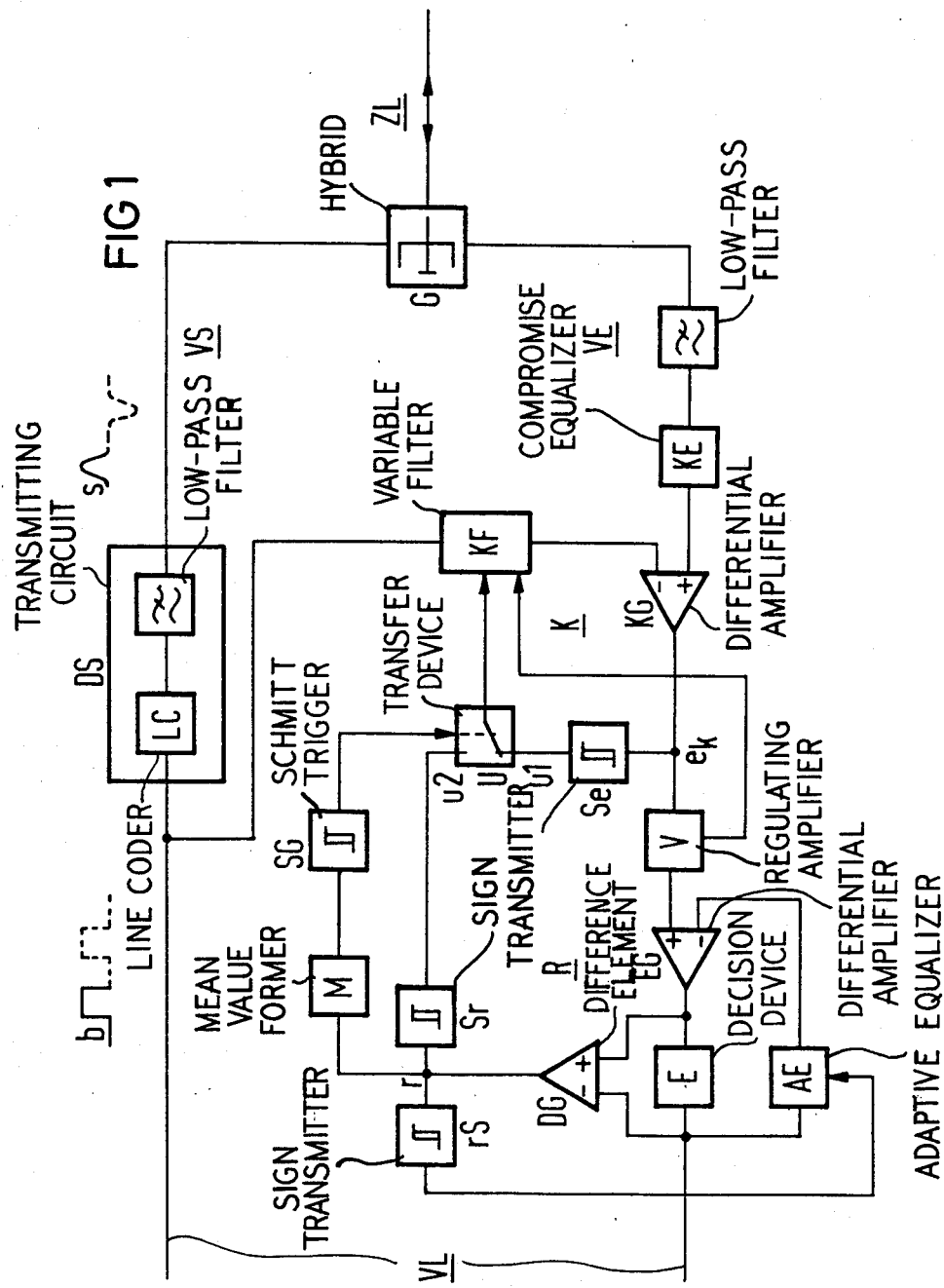

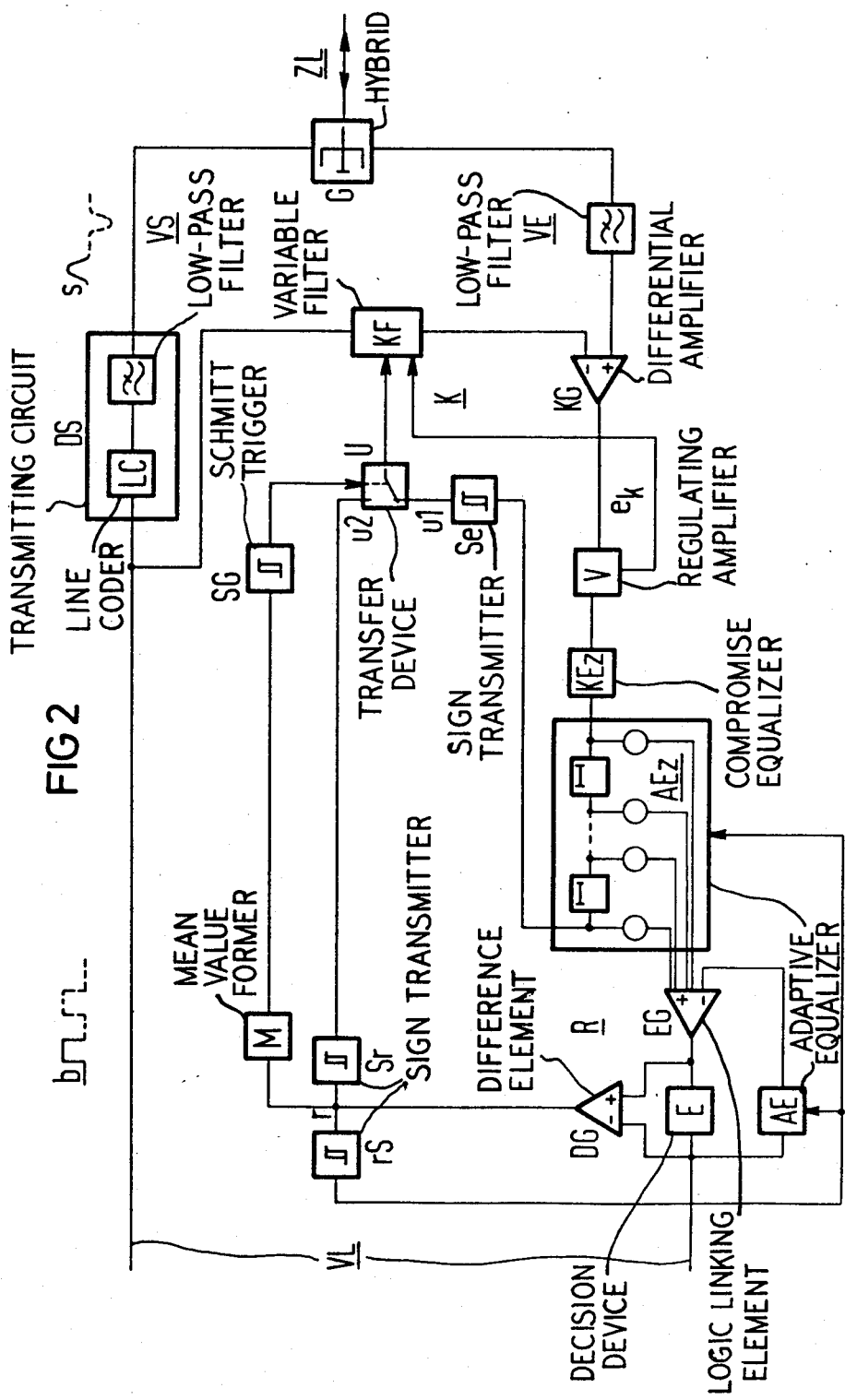

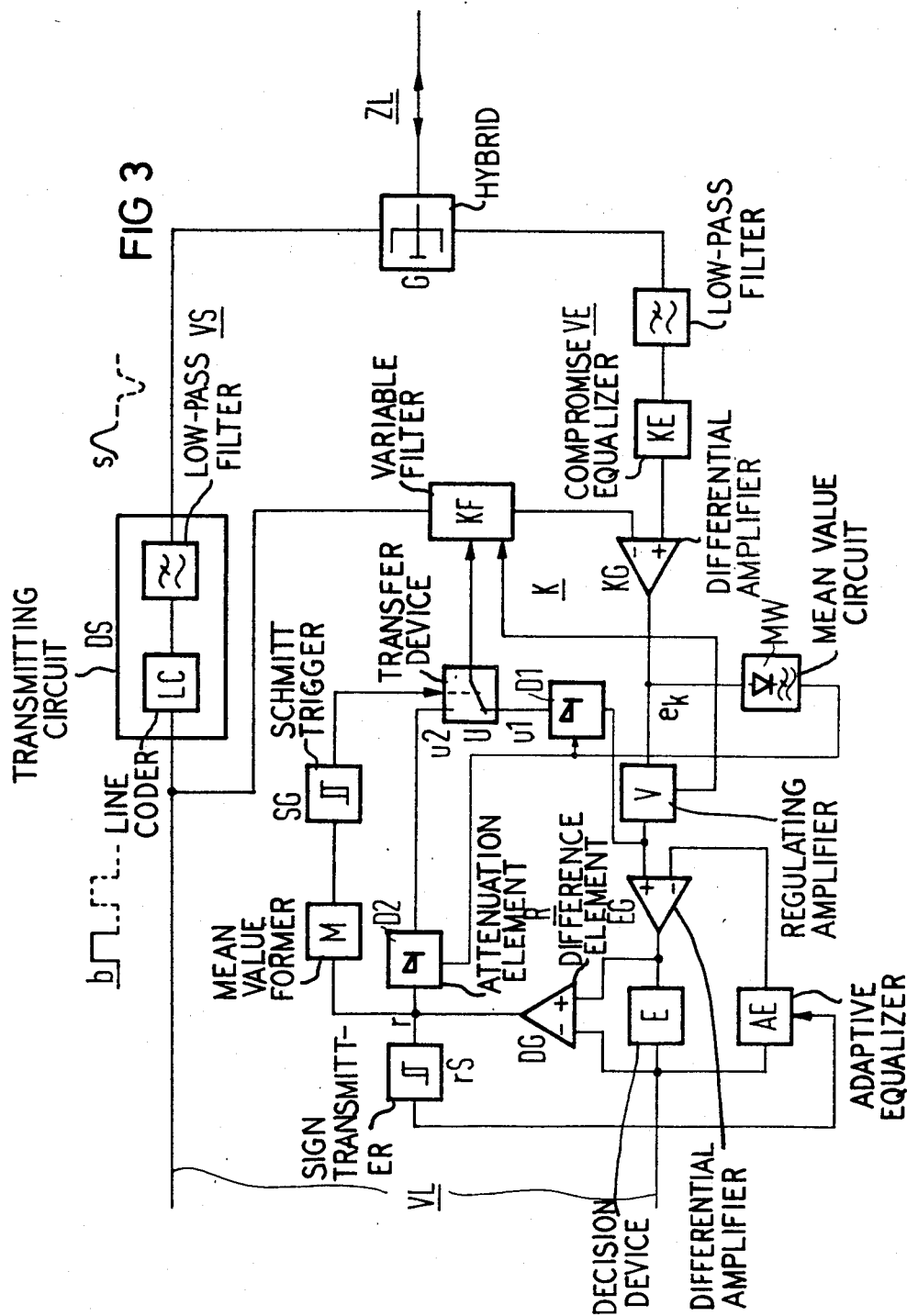

METHOD AND CIRCUIT ARRANGEMENT FOR COMPENSATING CROSS-TALK AND/OR ECHO SIGNALS

BACKGROUND OF THE INVENTION

1. Field of the Invention

The present invention relates to a method and a circuit arrangement for compensating crosstalk and/or echo signals, and more particularly to a method and a circuit arrangement in which such signals are compensated in a digital communication system using an adaptive crosstalk and/or echo compensation circuit.

2. Description of the Prior Art

In telecommunications systems, in the transmission of signals, linear signal disturbances can occur, for the elimination of which compensation circuits can be used. Such disturbances can be caused, for example, in telecommunications systems in which, for the conversion of two-wire lines into four-wire lines sections and vice-versa, hybrid circuits (bridge circuits) are provided, by virtue of the fact that a hybrid circuit of this type would have to contain an exact balance of the input impedance of the two-line wire in order to completely decouple the (receiving) arm of the four-wire line section, outgoing from the hybrid circuit, from the (transmitting) arm of the four-wire line section, incoming to the hybrid circuit, for which purpose the balancing line must be individually adapted to the two-wire line by accurate adjustment. This is accomplished with the assistance of a compromise balance, which is frequently used in practice and by way of which it is attempted to take into account various line impedances, the hybrid circuit, which then exhibits a finite blocking attenuation dependent upon the line impedance, is able to mutually decouple the transmitted and received signals only to a limited extent. On the other hand, even with optimum compensation of the hybrid circuit, echoes of its own transmitted signals which are caused by reflection points on the two-wire lines cannot be readily suppressed. Finally, in addition to the interference signals mentioned above, linear disturbance distortions produced in the transmission channel can also be compensated with the assistance of an adaptive equalizer.

In order to eliminate, or at least reduce crosstalk and/or echo signals, it is known, for example from the publication AGARD Conf. Proc. No. 103 (1972), pp. 12-1 . . . 12-16, and in particular to FIG. 12 and FIG. 13, and from FREQUENZ, Vol. 29, No. 5, 1974, pp. 118-122 and 155-161, and 122, and from Der Fernmelde-Ingenieur Vol 31, No. 12, 1977, pp. 1-25 and 21, to provide, between the four-wire line arm incoming to a hybrid circuit and the four-wire line arm outgoing from the hybrid circuit, an adaptive crosstalk and/or echo compensation circuit having a variable, non-recursive transversal filter and having a logic linking element which input-couples the compensation signal into the outgoing four-wire line arm, and in which the filter coefficients are adjusted in a regulating circuit which is basically known from, for example, the publication NTZ, Vol. 24, No. 1, 1971, pp.18-24 or from the book Bocker: Datenubertragung, Vol. 1, Chapter 5.3.2, in accordance with the residual signal which occurs following compensation in the outgoing four- wire line arm, so that this residual signal is minimized.

Such an adjustment of the adaptive filter, which is independent of the state of a receiving circuit which follows the outgoing four-wire line arm and which generally contains an adaptive equalizer connected before a decision device, and in which the compensated received signal, i.e. the receiving circuit input signal (or even only the sign thereof) serves as a regulating signal, in itself facilitates a reliable run-up of the compensation circuit to the status of the highest-attainable compensation accuracy. Since, however, the useful signal emanating from the two-wire line is superimposed upon the compensation error signal (residual signal), in order to ensure that the run-up takes place with the desired degree of accuracy, the adjustment value for the filter coefficients must be selected to be very small, which results in a relatively long run-up time and a long coefficient word length.

In addition, in order to eliminate, or at least reduce, crosstalk and/or echo signals, it is known from the Bell System Technical Journal Vol. 58, No. 2, 1979, pp. 491-500 and 493, in a compensation circuit of this type having a non-recursive digital filter having variable coefficients, to use the decision error of the decision device contained in the receiving circuit, i.e. the difference between the (compensated) input signal and the output signal of the decision device located in the outgoing four-wire line arm, as regulating signals for the adjustment of the filter coefficients and simultaneously for the adjustment of an adaptive equalizer which is provided with decision feedback.

Here, with a given synchronization so that no faulty decisions occur, it is only the compensation error signal (residual signal) which acts as a regulating signal, which results in a rapid run-up of the compensation circuit together with a relatively short coefficient word length. On the other hand, in the absence of synchronization, faulty decisions occur which of themselves result in long adjustment times and stability problems.

SUMMARY OF THE INVENTION

The object of the present invention is, for adaptive cross-talk and/or echo compensation by way of a variable filter and a logic linking element which input-couples the compensation signal into the outgoing four-wire line arm, to facilitate both a reliable and a rapid run-up of the compensation circuit to a high compensation accuracy status, even without special synchronization provisions, i.e. even from intermediate starting states.

The present invention relates to a method of compensating cross-talk and/or echo signals in a digital telecommunication system, with an adaptive cross-talk and/or echo compensation circuit which is provided between a four-wire line arm (transmitting arm) which in particular is incoming into a hybrid circuit located between a four-wire line and a two-wire line and a four-wire line arm (receiving arm) which in particular is outgoing from the hybrid circuit, with a variable filter and a logic-linking element which input-couples the compensation element into the outgoing four-wire line arm. This method is characterized, according to the present invention, in that the compensation signal is formed in dependence upon the difference between a decision output signal, formed in accordance with the crosstalk and/or echo compensation following an adaptive signal equalization, and a decision device input signal, in that in the event of a large difference between the decision device input signal and the decision device output signal the filter coefficient is adjusted in accordance with the compensated received signal, and in the case of a smaller difference between the decision device input signal and the decision device output signal it is adjusted in accordance with this difference.

The invention, which, by way of a relatively-large adjustment value in the coefficient adjustment in accordance with the compensated received signal, first carries out a coarse compensation relatively quickly and thus then facilitates an adaptive signal equalization which frees the decision error of useful signal distortion influences, results in the advantage of being able to utilize an overall larger adjustment value for the filter coefficients so that the run-up time of the compensation circuit and the coefficient word lengths are relatively short, but at the same time ensures a reliable run-up of the compensation circuit to the state of the highest-attainable compensation accuracy, even from intermediate starting states and therefore ensures a very accurate interference signal compensation.

Prior to the actual crosstalk and/or echo compensation, according to a particular feature of the invention, first a compromise equalization of the received signal can take place by way of which, in combination with a corresponding clock pulse control, distortions caused by pre-shoots of the channel pulse response are considerably reduced and therefore it is possible to dispense with a special pre-shoot equalizer.

Following the actual crosstalk and/or echo compensation, according to another feature of the invention, a regulated amplification can first take place. Here, the adjustment value for the filter coefficients can be formed in dependence upon the particular amplification in that, in the case of high amplification, the adjustment value is made smaller and, in the case of lower amplification, the adjustment value is made larger, which contributes to an acceleration of the coarse compensation.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic illustration of a digital telecommunication system having a hybrid circuit located between a four-wire line section and a two-wire line section;

FIG. 2 is a schematic representation of another embodiment of the circuit arrangement constructed in accordance with the invention; and FIG. 3 is a schematic illustration of a further exemplary embodiment of the invention.

DESCRIPTION OF THE PREFERRED EMBODIMENTS

Referring to the drawings, FIG. 1 schematically illustrates, on a scale necessary to enable the invention to be understood, a digital telecommunication system having a hybrid circuit G which is located between a four-wire line section VL and a two-wire line section ZL, wherein, between the four-wire line transmitting arm VS incoming into the hybrid circuit G and the four-wire line receiving arm VE outgoing from the hybrid circuit G there is arranged a crosstalk and/or echo compensation circuit K having a variable filter KF and a logic-linking element KG which input couples the compensation signal, formed by the latter, into the outgoing four-wire line arm VE and which has been repesented in FIG. 1 as a differential amplifier. The variable filter KF can preferably comprise a nonrecursive digital transversal filter such as it is known, for example from AGARD Conf. Proc. No. 103, 1972, pp. 12-1-12-16, and FREQUENZ Vol. 29, No. 5, 1974, pp. 118-122 and 155-161, and therefore does not need to be shown in further detail here. In its (transmitting) arm VS, incoming into the hybrid circuit G, the four-wire line section VL comprises a digital signal transmitting circuit DS for the transmission of transmitted signal pulses s of predetermined form and having a predetermined center of gravity of their frequency spectrum. In this respect, the drawing indicates that the transmitting circuit DS, which comprises a line coder LC and a low-pass filter, is capable of converting binary signal pulses b, with which it is supplied, into alternate marking mark inversion (AMI) signal pulses s. In its receiving arm VE, outgoing from the hybrid circuit G, the four-wire line section VL comprises a digital signal receiving circuit in which the received signal pulses can first pass through a filter circuit and a compromise equalizer KE, whereupon they pass to the logic-linking element KG (differential amplifier) at whose output $e_k$ the compensated received signal occurs. The output $e_k$ of the compensation circuit KG is connected, as shown on the drawing, via a regulating amplifier V, to an amplitude decision device E, which is to be constructed from a Schmitt trigger circuit. Although not shown in detail on the drawing, the amplitude decision device E can be followed by a received signal converter which can convert the signal pulses, with which it is supplied, for example into corresponding binary signals, where, on the basis of the signal forms indicated on the drawing, a received signal converter of this kind can fundamentally comprise a rectifier circuit.

The transmitted signal pulses s pass from the transmitting arm VS of the four-wire line section VL via the hybrid circuit G to the two-wire line ZL, which consists, for example, of a subscriber connection line and by way of which the signals are transmitted to the opposite station (not shown on the drawing) of the digital telecommunication system, therefore, for example, to a subscriber station or an exchange. In the reverse direction of transmission, signal pulses which originate from the opposite station and which are transmitted via the two-wire line ZL pass via the hybrid circuit G, as received signal pulses, to the receiving arm VE of the four-wire line section VL. If the two-wire line section ZL contains reflection points, which can be represented by points at which sudden changes occur in line parameters, then in addition to the actual received signal pulses, which in addition can also be subject to distortions as a result of their transmission, echoes of the transmitted signal pulses s also reach the receiving arm VE of the four-wire line section VL, and moreover with limited hybrid blocking attenuation, direct components of the transmitted signal pulses s can also reach the receiving arm VE. In the receiving arm VE there then occurs a received signal mixture of the actual (more or less distorted) received signal pulses, and an interference signal composed of echo and/or crosstalk signals. This latter interference signal is to be compensated with the assistance of the compensation circuit K which forms a corresponding compensation signal in accordance with the transmitted signal, for which purpose the filter coefficients of the variable filter KS must be set accordingly in the compensation circuit K.

For setting of the filter coefficients, in the circuit arrangement illustrated in FIG. 1, there is provided a regulating signal link which connects the output $e_k$ of the crosstalk and/or echo compensation circuit K to a regulating signal input of the variable filter KF and which permits the filter coefficients to be adjusted in accordance with the compensated received signal which occurs at the compensator output $e_k$ in such a manner that the residual signal is minimized. Such an adjustment of the filter coefficients is basically known, for example, from the publication NTZ, Vol. 24, No. 1, 1971, pp. 18–24, from the publication AGARD Conf. Proc. No. 103, 1972, pp. 12-1-12-16 or from the publication Bocker: Datenubertragung, Vol. 1, Chapter 5.3.2, and therefore does not require a further detailed explanation. It should be noted, however, as can also be seen on FIG. 1, an element Se is provided which transmits only the signal sign and is interposed into the regulating signal link which extends from the output $e_k$ of the compensation circuit K to the regulating circuit input of the variable filter KF in which case the coefficient adjustment is then carried out in accordance with the sign of the compensated received signal.

In the arrangement constructed in accordance with the invention and illustrated in FIG. 1, the regulating signal link which extends from the output $e_k$ of the compensation circuit K to the regulating signal input of the variable filter KF extends across a first input u1 of a transfer device U. A difference element DG is connected to the other input u2 of the transfer device U, and in fact possibly by way of an element Sr which transmits only the signal sign in question, as indicated on the drawing. The difference element DG forms part of the regulating circuit R in which the difference element DG is connected at its input end to the input and to the output of the decision device E located in the four-wire line arm VE behind the logic-linking element KG of the compensation circuit K. Here, the decision device output is fed back via an adaptive equalizer AE, which is likewise controlled by the difference element DG, to a logic-linking element EG which precedes the decision device input and which input couples the equalizer output signal into the four-wire line arm VE, where again an element rS, which transmits only the signal sign, can be interposed between the regulating signal output r of the regulating signal circuit R and the control input of the adaptive equalizer AE. By way of a limit signal element (Schmitt trigger) SG, the regulating signal output r, which is formed by the output of the difference element DG, of the regulating signal circuit R, is connected to the control input of the transfer device U, where, as also indicated in FIG. 1, a mean value formation circuit M forms the signal mean value and may be interposed between the regulating signal output r of the regulating signal circuit R and the Schmitt trigger SG.

The setting of an appropriate threshold value for the Schmitt trigger SG now means that, in the variable filter KF, the compensation signal which is fed to the logic-linking element KG to the receiving arm VE is formed in dependence upon the, possibly averaged, difference between the decision device output signal, which is formed after the crosstalk and/or echo compensation in the course of the amplitude decision, and the decision device input signal. In the case of a large, possibly averaged, difference between the decision device input signal and the decision device output signal, the filter coefficients are adjusted in accordance with the compensated received signal or in accordance with its sign. The coarse compensation which can thus be achieved relatively rapidly then permits the adaptive equalizer AE to free the useful signal, which is superimposed upon the residual signal, of distortions to such an extent that the decision error signal contains practically only the residual signal. In the case of the smaller, possibly averaged, difference between the decision device input signal and the decision device output signal, the filter coefficients are then adjusted in accordance with this difference or their sign, whereby both rapid and reliable run-up of the compensation circuit is achieved. As is also indicated on the drawing, the adjustment value for the filter coefficients can also be dependent upon the relevant amplification of the regulating amplifier V, in that in the case of a high amplification the adjustment value of the variable filter KF is made smaller and in the case of a lower amplification the adjustment value is made larger.

With reference to FIG. 1, the preceding description has explained a circuit arrangement for the compensation of crosstalk and/or echo signals in a digital telecommunication system, with an adaptive crosstalk and/or echo compensation circuit which is arranged between an incoming four-wire line arm, in particular the four-wire line transmitting arm incoming into a hybrid circuit located between a four-wire line and a two-wire line, and an outgoing four-wire line arm, in particular the four-wire line receiving arm outgoing from the hybrid circuit, with a variable filter, and which a logic-linking element which input-couples the compensation signal into the outgoing four-wire line arm, wherein a regulating signal link which leads from the output of the crosstalk and/or echo compensation circuit to the regulating signal input of the variable filter extends to the first input of the transfer device whose other input is connected to a difference element of a regulating signal circuit in which the difference element is connected to the input and to the output of the decision device located in the outgoing four-wire line arm behind the compensation element. The output of the difference element is connected by way of an adaptive equalizer controlled by the difference element to a logic-linking element which precedes the decision device input and which input-couples the equalizer output signal into the outgoing four-wire line arm. Also, the regulating signal output of the regulating signal circuit is connected by way of a limit signal element (Schmitt trigger) to the control input of the transfer device. In a circuit arrangement of this kind, the compensation element in the outgoing four-wire line arm could be preceded by a compromise equalizer.

However, it can be desirable to avoid the relatively long control word for the compromise equalizer which is required for such compromise equalization which takes place prior to the crosstalk and/or echo compensation. This is achieved within the scope of the method outlined initially, in accordance with further features of the invention in that a compromise equalization of the compensated received signal takes place. In the aboveoutlined circuit arrangement, in accordance with further features of the invention, for this purpose a compromise equalizer is interposed into the link which leads from the compensation element to the logic-linking element which precedes the decision device input.

This further development of the invention permits a shorter control word to be used for the compromise equalizer than would be necessary for a compromise equalization taking place prior to the crosstalk and/or echo compensation.

With the assistance of the above-described adaptive signal equalization which provides decision feedback, it is possible to eliminate received signal trailing transients. However, it can additionally desired to eliminate leading transients of the compensated received signal.

This is achieved within the scope of the method initially outlined in accordance with further features of the invention in that an adaptive equalization takes place between the compensation of the received signal and the amplitude decision. In the above-described circuit arrangement, for this purpose in accordance with further features of the invention, an adaptive equalizer is interposed into the link which leads from the compensation element to the logic-linking element which precedes the decision device input.

Therefore, the present invention also allows the compensated received signal to be freed of any disturbing leading transients.

Prior to the adaptive equalization, the afore-mentioned compromise equalization of the compensated received signal can firstly take place, for which purpose a compromise equalizer is interposed into the link extending from the compensation circuit to the adaptive equalizer.

The further features mentioned above are illustrated in FIG. 2 which represents a further exemplary embodiment of a circuit arrangement constructed in accordance with the invention. Here, the exemplary embodiment of a digital telecommunication system is represented in FIG. 2 and largely corresponds, in terms of its structure and mode of operation, with the digital telecommunication system of FIG. 1. In this respect the above details of the circuit arrangement of FIG. 1 also applied to the circuit arrangement of FIG. 2. In contrast to the structure of FIG. 1, in the exemplary embodiment of FIG. 2 of the circuit arrangement contructed in accordance with the invention, the output $e_k$ of the compensation circuit K is connected via a regulating amplifier V to the input of a compromise equalizer KEz which equalizes the compensated received signal and which is provided for this purpose in place of, or in addition to, a compromise equalizer which equalizes the uncompensated received signal. The compromise equalizer KEz is connected across an adaptive equalizer AEz which, in this exemplary embodiment consists of a transversal filter, and via the logic linking element EG, which is to be constructed, for example, from an adder and a following differential amplifier. The adaptive equalizer AEz can be adjusted in the same manner as the adaptive equalizer AE which provides a decision feedback, as also indicated on the drawing. The two adaptive equalizers AEz and AE then free the compensated, amplified and compromise-equalized received signal both of signal leading transients and signal trailing transients.

The delay in the receiving arm VE, which is associated with the adaptive equalizer AEz is taken into consideration in the setting of the filter coefficients of the variable filter KF via the input u2 of the transfer device U. In order to avoid a jump in the transit time of the setting signal, in the setting of the filter coefficients of the variable filter KF via the transfer input u1, the same delay must prevail as in the case of a filter setting via the transfer input u2, which is achieved in the exemplary embodiment of FIG. 2 in that the connection of the ouput $e_k$ of the compensation element KG to the transfer input u1 leads across the delay chain of the adaptive equalizer AEz. Alternatively, a corresponding delay element could be connected directly prior to the transfer input u1. In both cases the delay must then be taken into account in the setting of the filter coefficients of the variable filter KF.

As can be seen from FIG. 1 and FIG. 2, following the crosstalk and/or echo compensation, firstly a regulated amplification of the compensated received signal can take place, for which purpose the compensation element is followed by a regulating signal amplifier. For this purpose, in the above description of FIG. 1, it has already been set forth that the adjustment value for the filter coefficients for the variable filter can be formed in dependence upon the relevant amplification in that in the case of higher amplification the adjustment value is made smaller and in the case of lower amplification the adjustment value is made larger.

The control signal which, for this purpose, is supplied to a variable filter from the regulating amplifier in itself also permits the influence of the received signal amplification upon the regulating signals which are fed to the regulating signal input of the variable filter to be taken into account, which is necessary when the filter coefficients are set not only in accordance with the sign of the relevant regulating signal, which however leads to a correspondingly more elaborate filter setting. However, it is possible to avoid such an elaborate filter setting. This is achieved within the scope of the method initially outlined and which firstly provides a regulated amplification following the crosstalk and/or echo compensation, in accordance with further feature of the invention in that the setting signal for the variable filter derived from the difference between the decision device input signal and the decision device output signal and, when the setting signal corresponding to the compensated received signal is derived from the compensated and amplified received signal, also this setting signal for the variable filter is multiplied by a factor which is reciprocally proportional to the amplification factor.

In the circuit arrangement initially outlined, in which the compensation element is followed by a regulating amplifier, for this purpose, in accordance with further features of the invention, into the regulating signal path which extends across the other input of the transfer device, as mentioned in the introduction, and when the regulating signal path which extends across the aforementioned other transfer input branches off from the receiving arm of the four-wire line only following the regulating signal amplifier, then also into this regulating signal path there is in each case interposed an attenuating element having an attenuation factor which is proportional to the amplification factor of the regulating signal amplifier.

In this manner, this further development of the invention allows the signal amplification to be taken into account even before the actual filter setting by way of a corresponding correction of the input signal which is in each case fed to the variable filter.

A further development of the type set forth above is illustrated in FIG. 3 which represents a further exemplary embodiment of a circuit arrangement constructed in accordance with the invention. Here, the structure and mode of operation of the digital telecommunication system represented in FIG. 3 largely corresponds to the digital telecommunication system set forth with respect to FIG. 1. In respect, the above details of the circuit arrangement of FIG. 1 also applies to the circuit arrangement shown in FIG. 3.

For the setting of the filter coefficients, in the circuit arrangement represented in FIG. 3, there is firstly provided a regulating signal link which leads from the output of the regulating amplifier V to the regulating signal input of the variable filter KF and which permits the filter coefficients to be set in accordance with the compensated received signal which occurs at the compensator output $e_k$, in such a manner that the residual signal is minimized. As already set forth above, such a setting of the filter coefficients known, for example, from the publication AGARD Conf. Proc. No. 103, 1972, pp. 12-1-12-16, and therefore does not require a detailed discussion here. In contrast to the factors illustrated in FIG. 1, in accordance with the embodiment of FIG. 3, into the regulating signal link which leads from the output of the regulating amplifier V via the first input u1 of the transfer device U to the regulating signal input of the variable filter KF there has been interposed an attenuating element D1 having an attenuation factor which is proportional to the amplification factor of the regulating signal amplifier, so that as a result the coefficient setting takes place in accordance with the unamplified compensated received signal. Naturally, this can also be achieved by directly connecting the transfer input u1 of the transfer device U to the output $e_k$ of the compensation element KG.

Similarly and in accordance with FIG. 3, an attenuating element D2 having an attenuation factor which is proportional to the amplification factor of the regulating signal amplifier has been interposed into the regulating signal link which leads from the output of the difference element DG via the other input u2 of the transfer device U to the regulating signal input of the variable filter KF.

In contrast to the conditions illustrated in FIG. 1, therefore in the exemplary embodiment illustrated in FIG. 3 of a circuit arrangement contructed in accordance with the invention, into whose regulating signal link which leads to the regulating signal input of the variable filter KF there are interposed no elements which transmit only the signal sign, during the amplification of the compensated received signal the regulating signal which is fed via the transfer input u2 of the transfer device U to the regulating signal input of the variable filter KF, and also the regulating signal transmitted via the transfer input u1, when, as is also the case in the exemplary embodiment illustrated in FIG. 3, this regulating signal is tapped behind the regulating signal amplifier V, are however multiplied by a factor which is reciprocally proportional to the relevant amplification factor in order to avoid mis-settings of the filter KF. As also indicated in FIG. 3, this can be effected with the assistance of a mean value circuit MW which is constructed, for example, from a rectifier circuit and a low-pass filter and by whose output signal, which is proportional to the magnitude of the received signal occurring at the compensator output $e_k$ and this is inversely proportional to the amplification factor of the regulating amplifier V, the relevant regulating signal is multiplied in the attenuation element D1 or D2 designed in the case of this example as a modulator. Finally, it should also be noted that the actual decision error signal occurs only at a decision time of the decision device E at the regulating signal output r of the regulating signal circuit R. Therefore, it is only at this time that the received signal experiences the necessary compensation, which, however, is sufficient since the decision device E is also active only at precisely this time. In contrast to that illustrated on the drawing, it is naturally also possible to subject the received signal sampling directly following the filter circuit arranged in the four-wire line receiving arm behind the hybrid circuit G in a clock pulse, in which case the received signal is then crosstalk and/or echo compensated in this digital representation. The received signal which is obtained as a result of the sampling and which is obtained as a result of the sampling and which is retained between sampling times and is therefore step-shaped (represented in digital form), then experiences the necessary compensation on each occasion, although, here again, the compensation takes place only at the decision time of the decision device E.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a method of compensating echo and/or crosstalk signals in a digital communication system of the type having an adaptive compensation circuit arranged between a transmitting arm and a receiving arm of a four-wire line as referenced to and connected to a two-wire line by way of a hybrid circuit, the compensation circuit including a settable variable filter, and a logic-linking element for input coupling a compensation signal from the variable filter to the receiving arm thereby compensating echo and/or crosstalk signals contained in a received signal and forming it into a compensated received signal, the improvement comprising the steps of:

adaptively compensating and equalizing a signal received in the receiving arm;

applying the equalized signal to a decision device as its input signal and forming a setting signal;

setting the variable filter coefficients in accordance with the compensated received signal when the difference between the input and output signals of the decision device is greater than a predetermined amount; and setting the variable filter coefficients in accordance with the difference between the input and output signals of the decision device when that difference is less than said predetermined amount.

2. The improved method of claim 1, wherein:

prior to the setting steps, averaging the difference between the input and output signals of the decision device, and setting the filter coefficients in accordance with the compensated received signal when the averaged difference between the input and output signals of the decision device is greater than a predetermined amount, and setting the filter coefficients in accordance with the difference between the input signal and the output signal of the decision device when the amount is smaller than the predetermined averaged difference.

3. The improved method of claim 1, wherein the step of adaptively equalizing and compensating is further defined as:

compromise equalizing the received signal before compensating for echo and/or crosstalk.

4. The improved method of claim 3, and further comprising the step of:
   following the step of echo and/or crosstalk compensation, regulating and amplifying the compensated received signal.

5. The improved method of claim 4, wherein the steps of setting are further defined as:
   forming an adjustment value for the filter coefficients in dependence upon amplification so that for a high amplification the adjustment value is made smaller and for a lower amplification the adjustment value is made larger.

6. The improved method of claim 5, wherein the steps of setting are further defined as:
   setting the filter coefficients only in accordance with the sign of the difference of the input and output signals of the decision device.

7. The improved method of claim 5, wherein the steps of setting are further defined as:
   setting the filter coefficients only in accordance with the sign of the compensated received signal.

8. The improved method of claim 5, wherein the step of forming a setting signal is further defined as:
   multiplying the setting signal derived from the difference between the input and output signals of the decision device and multiplying the setting signal corresponding to the amplified compensated received signal, by a factor which is reciprocally proportional to the amplification factor.

9. The improved method of claim 8, and further comprising the step of:
   compromise equalizing the compensated received signal.

10. The improved method of claim 9, and further comprising the step of:
    adaptively equalizing the compensated received signal prior to application to the decision device.

11. A circuit arrangement for compensating interference signals, including echo and crosstalk signals, in a digital communications system in which a two-wire line is connected to a four-wire line, including a transmitting arm having a transmitting circuit and a receiving arm having a receiving circuit, by way of a hybrid, comprising:
    a variable filter connected to said transmitting arm at the input of said transmitting circuit for receiving signals to be transmitted, connected to said receiving circuit for applying filter signals thereto, and including a regulating signal input and a compensation signal output;
    a compensation circuit in said receiving circuit including an input coupled to said compensation signal output;
    a decision device including an input coupled to said compensation circuit and an output;
    a difference element for forming a regulating signal, including an output, and a pair of inputs respectively connected to said input and said output of said decision device;
    a transfer device including first and second inputs, a control input and an output, said output connected to said regulating signal input of said filter;
    a logic linking element including an output connected to said input of said decision device, a first input coupled to said receiving circuit to input the output signal of said compensation circuit to said decision device, and a second input;
    an adaptive equalizer including an input connected to said output of said decision device, and an output connected to said second input of said logic linking element, and a control input;
    means coupling said output of said difference element and said control input of said adaptive equalizer;
    means coupling said receiving circuit to said first input of said transfer device
    means connecting said output of said difference element to said second input of said transfer device; and
    control means comprising a threshold detector and connecting said output of said difference element to said control input of said transfer device to selectively connect said first and second inputs of said transfer device to said regulating input of said variable filter via said output of said transfer device.

12. The circuit arrangement of claim 11, and further comprising:
    a compensation equalizer connected to the input of said compensation circuit.

13. The circuit arrangement of claim 11, and further comprising a regulating amplifier connecting the output of said compensation circuit to said compensated signal input of said filter.

14. The circuit arrangement of claim 11, wherein:
    said means connecting said output of said difference device to said second input of said transfer device comprises a sign transmitter operable to transmit only the sign of the regulating signal.

15. The circuit arrangement of claim 11, wherein:
    said means coupling said receiving circuit to said first input of said transfer device comprises a sign transmitter operable to transmit only the sign of the compensated signal.

16. The circuit arrangement of claim 13, wherein:
    said means connecting said output of said difference device to said second input of said transfer device comprises an attenuation device; and
    said means coupling said receiving circuit to said first input of said transfer device comprises an attenuation device connecting said regulating amplifier to said first input of said transfer device.

17. The circuit arrangement of claim 11, wherein said control means comprises a signal averaging circuit connected to said output of said difference device and a limit signal element connecting said averaging circuit to said control input of said transfer device.

18. The circuit arrangement of claim 11, wherein:
    said sign transmission means comprises means responsive to the sign of the regulating circuit for transmitting that sign to said adaptive equalizer.

19. The circuit arrangement of claim 11, and further comprising
    a regulating amplifier in said receiving circuit and having an amplification factor; and
    means for setting an adjustment value for said variable filter in inverse proportion to the amplification factor of said regulating amplifier.

20. The circuit arrangement of claim 11, and further comprising a compromise equalizer interposed between said compensation circuit and said logic linking element.

21. The circuit arrangement of claim 20, and further comprising:
    a further adaptive equalizer including a control input connected in common with said control input of the first-mentioned adaptive equalizer, an input connected to said compromise equalizer, a first output coupled to said first input of said transfer device, and at least one further output; and said logic linking element comprises a plurality of inputs for connection to said at least one further output of said further adaptive equalizer.

22. The circuit arrangement of claim 11, wherein:
said threshold detector comprises a Schmitt trigger circuit.

* * * * *